(12) United States Patent
Petkevich et al.

(10) Patent No.: US 8,456,532 B1
(45) Date of Patent: Jun. 4, 2013

(54) INTERNET PROTOCOL CAMERA TRANSCODE AVOIDANCE

(75) Inventors: Daniel T. Petkevich, Solana Beach, CA (US); Rand D. Anderson, Cardiff, CA (US); Brett J. Going, San Diego, CA (US); Peter A. Jankowski, Rancho Santa Fe, CA (US)

(73) Assignee: Next Level Security Systems, Inc., Carlsbad, CA (US)

( * ) Notice: Subject to any disclaimer, the term of this patent is extended or adjusted under 35 U.S.C. 154(b) by 178 days.

(21) Appl. No.: 13/093,727

(22) Filed: Apr. 25, 2011

(51) Int. Cl.
*H04N 5/225* (2006.01)
(52) U.S. Cl.
USPC .................................. 348/207.1; 348/207.11
(58) Field of Classification Search
USPC ..... 725/105, 113, 12, 42, 146, 87; 348/211.3, 348/207.1, 207.11; 717/172; 386/95
See application file for complete search history.

(56) References Cited

U.S. PATENT DOCUMENTS

| | | | |
|---|---|---|---|
| 5,546,395 | A | 8/1996 | Sharma et al. |
| 6,731,734 | B1 | 5/2004 | Shaffer et al. |
| 6,922,490 | B2 | 7/2005 | Ikeda et al. |
| 7,002,992 | B1 | 2/2006 | Shaffer et al. |
| 7,072,959 | B2 | 7/2006 | Huart et al. |
| 2006/0070111 | A1* | 3/2006 | Kurosawa ..................... 725/105 |
| 2008/0231712 | A1* | 9/2008 | Frink et al. ................. 348/207.1 |

OTHER PUBLICATIONS

"SNCRZ5ON—Network PTZ Camera with 340 Pan, Day/Night, H.264 and JPEG/MPEG-4 Dual Streaming", http://pro.sony.com/bbsc/ssr/mkt-security/mkt-securityptzcameras/product/SNCRZ50N, (Observed Jul. 27, 2011), 8 pages.
Osipov, Andrey E., "Dynamic Voice Codec Determination Mechanism for Voip", A Thesis by Andrey E. Osipov, bachelor of Science, Wichita State University, 2004, Submitted to the Department of Electrical and Computer Engineering and the faculty of the Graduate School of Wichita State university, (May 2006), 76 pages.

* cited by examiner

*Primary Examiner* — Roberto Velez
*Assistant Examiner* — Stephen Coleman
(74) *Attorney, Agent, or Firm* — Schwegman, Lundberg & Woessner, P.A.

(57) ABSTRACT

A method and a system for transcode avoidance of a data stream from a camera at a client device are described. A camera generates data streams with each data stream having a corresponding data configuration. A web server discovered by the camera dynamically determines data configuration for each data stream, the configuration of the client device, and the network conditions at the client device. The web server dynamically identifies a data stream for the client device based on the data configuration of each data stream from the camera, the configurations of the client device, and the network conditions at the client device so that the client device or an intermediary device do not need to transcode the identified data stream. The web server refers the client device to receive the identified data stream from the camera.

18 Claims, 8 Drawing Sheets

INTERNET PROTOCOL CAMERA TRANSCODE AVOIDANCE

TECHNICAL FIELD

This application relates generally to the field of computer technology, and in a specific example embodiment, a method and system for avoiding transcoding a digital video signal from a camera at a client device via a computer communication network.

BACKGROUND

Video is important in the field of security and surveillance. Video is often handled in digital form. This offers many advantages over analog video. Analog video is typically digitized and compressed by a dedicated hardware device called an encoder. The encoder generates a digital video stream that has been compressed in one of many digital video compression formats such as MPEG2, MPEG4 and MJPEG, and H.264. The encoder also provides an interface to a standard data network such as Gigabit Ethernet and transmits the video using one of many standard network protocols such as TCP/IP or UDP. Other application layer protocols can be used on top of TCP such as HTTP and RTP to assist in the delivery of digital video to other devices connected to the network.

There are several advantages that are gained by converting the video to digital form that can be transmitted over standard video networks. Scaling of the number of video sources is no longer an issue because an arbitrary number of sources can be handled. Standard network switches can be added for more network connections. The nature of IP switching and routing allows this scaling to work easily and smoothly. The digital data network allows the video to be transmitted over any distance. The data network also acts as a switching system. Digital video sources may be switched to any destination connected to the network. With IP networks, the switching is packet based, but modern IP networks are easily able to switch real-time streams of digital video between any source and any destination as long as there is no congestion encountered along the way and the needed paths through the network have sufficient bandwidth for the streams.

However, some client devices are still required to transcode the encoded digital video stream from the camera from one compression format to another digital video compression format compatible with a video player at the client device. Such a transcoding process consumes limited resources available at the client device. Even after transcoding, the client device may still require frames to be dropped or the image to be resized because of device and bandwidth limitations.

BRIEF DESCRIPTION OF THE DRAWINGS

The present invention is illustrated by way of example, and not by way of limitation, in the figures of the accompanying drawings in which.

DETAILED DESCRIPTION

Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

In various embodiments, a method and a system for directing a data stream from an IP camera to a client device, without transcoding the data stream are described. An IP camera generates data streams where each data stream has a corresponding data configuration. A web server discovered by the camera dynamically determines data configuration for each data stream, the configurations of the client device, and the network conditions at the client device. The web server dynamically identifies a data stream for the client device based on the data configuration of each data stream from the camera, the configurations of the client device, and the network conditions at the client device so that the client device does not need to transcode the identified data stream or any other intermediary data stream received from the camera.

Figure 1A:
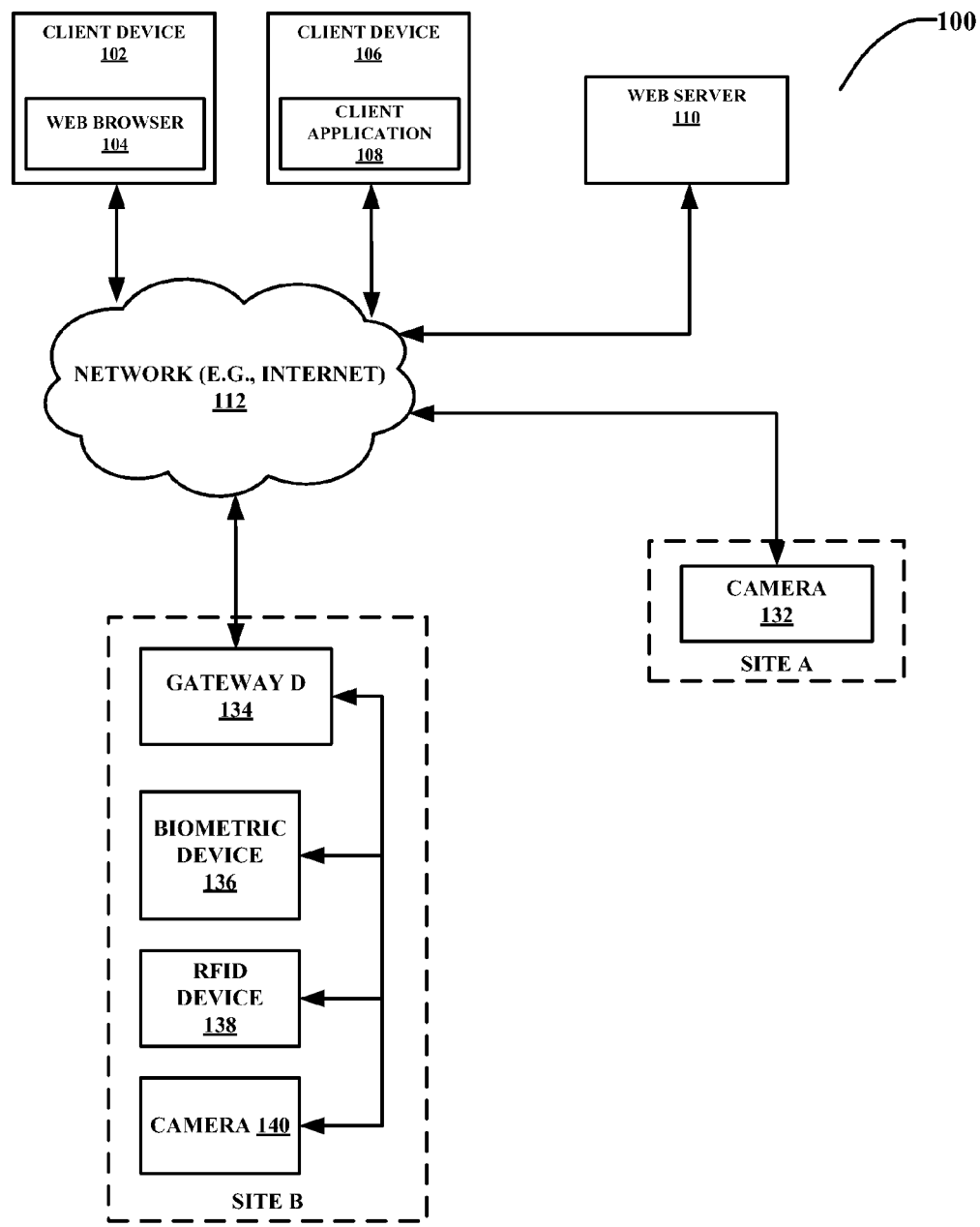
FIG. 1A is a network diagram depicting a network environment according to one embodiment, for exchanging data over a network.

FIG. 1 is a network diagram depicting a network system 100, according to one embodiment, for exchanging data over a computer network 112 (e.g. TCP/IP network). For example, the digital video network system 100 includes client devices 102, 106, a web server 110, a camera 132 at a first site A, another camera 134 at another second site B. Although illustrated herein as a client-server architecture as an example, other embodiments may include other network architectures, such as a peer-to-peer or distributed network environment.

For purposes of the present embodiment, the terms "sites" and "premises" refer to any location to be monitored, whether residential, commercial, public, or secured. Further, the term "a" is generally used in the present disclosure to mean one or more. Still further, the terms "coupled" and "operatively coupled" mean connected in such a way that data may be exchanged. It is understood that "coupled" and "operatively coupled" do not require a direct connection, a wired connection, or even a permanent connection. It is sufficient for purposes of the present embodiments that the connection(s) be established for the sole purpose of exchanging information.

The computer network 112 can include a local area network (LAN) where Gigabit Ethernet switches are used to switch data. In another example, the computer network 112 includes a wide area network, such as the Internet. In general, computer network 112 may be a public network or private network, a single network or a combination of several networks. In most embodiments, computer network 120 may be, but is not required to be, an IP-based network. In some embodiments it may be desirable for all or a portion of network 120 to include publicly available networks, such as the Internet, to avoid the need for installing, purchasing, or leasing additional infrastructure.

In one embodiment, the camera 132 is directly connected to the network 112. In another embodiment, the camera 140 is connected to a gateway 134 located at the second site B. The second site B includes several security devices connected to the gateway 134: biometric device 136, RFID device 138, IP camera 140. The gateway communicates with the network 112. In one embodiment, the camera 132 registers directly with the web server 110. The camera 140 registers with the web server 110 through the gateway 134.

Analog video from cameras 132, 140 is digitized and encoded by hardware encoders (not shown) connected to the network 112. The hardware encoder may reside inside the cameras 132, 140 or may be implemented externally to the cameras 132, 140. The hardware encoder generates digital video that can be streamed to any destination on the network 112. In one embodiment, the cameras 132, 140 generate multiple streams, each stream having different format based on configurations such as resolutions, frame, rates, settings, encoding algorithms. One embodiment of the camera is described in more detail below with respect to FIGS. 2A and 2B.

To display a video source, a client device 102, 106 establishes a network connection to a source (e.g., a camera) and then decodes the digital video before displaying it on a display device attached to the corresponding client device. Software on the client devices 102, 106 can support receiving and displaying more than one video source at a time, so that several video windows can be decoded and displayed at once. This software can also allow a human operator at the client devices 102, 106 the ability to dynamically choose which of many digital video sources to connect to and display. For example, the user may decide to view a specific stream from a particular camera.

In another embodiment, the web server 110 may also connect to the network 112 both to receive and transmit digital video. The web server 110 may also be referred to as a web-based host. The web server 110 is connected to the computer network 112 by means of a network interface. The network interface can take the form of a network interface card (not shown) installed within the web server 110 to enable data to be sent and received to and from the network 112 by the web server 110.

The web server 110 can provide other functions including recording the video to disk storage, playing back recorded video (e.g., on demand) to a requesting client device, and replicating video streams so that a single video stream can be received by multiple client devices or servers without the need for multicast transmission from the source. The combination of the digital video encoders, network and client devices provide a flexible and scalable video switching and display system.

In one embodiment, the web server 110 identifies one or more gateway(s) for the client devices 102, 106 to communicate with, so as to monitor and/or control the security devices connected to the corresponding gateway(s). Generally, gateway 134 includes a processor-based device that operates to monitor conditions at a target site or premise, to analyze monitoring data, to detect alarm conditions at the target site or premise, to capture information relating to such alarm conditions, and to send such monitoring information to client devices 102, 106 and/or the web server 110.

The web server 110 may provide server-side functionality, via the network 112 to the client devices 102, 106. The client devices 102, 106 may include users that utilize the network system 100 and more specifically, the web server 110, to view video streams from cameras 132, 140 over the network 114. These transactions may include transmitting, receiving (communicating) and processing data to, from, and regarding content and users of the network system 100. The data may include, but are not limited to audio, video, pictures, metadata, camera configuration data, client device configuration data, and network monitoring data. In one embodiment, the web server 110 may include a directory of cameras and client devices. The web server 110 is described in more detail below with respect to FIGS. 3A and 3B.

The client devices 102, 106 are also connected to the network 112. A network interface means is provided to enable the client devices 102, 106 to place data on, and remove data from, the network 112. The client device 102 may include a web browser 104 that may be in communication with the web server 110 and the cameras 132 and 140. In another embodiment, the client device 106 may include a programmatic client, such as a client application 108. The client devices 102 and 106 may also include a mobile device such as a portable electronic device (e.g., mobile phone, tablet computer, portable audio/video player, or global positioning system (GPS) device) providing at least some of the functionalities of the client devices 102 and 106.

Figure 1B:
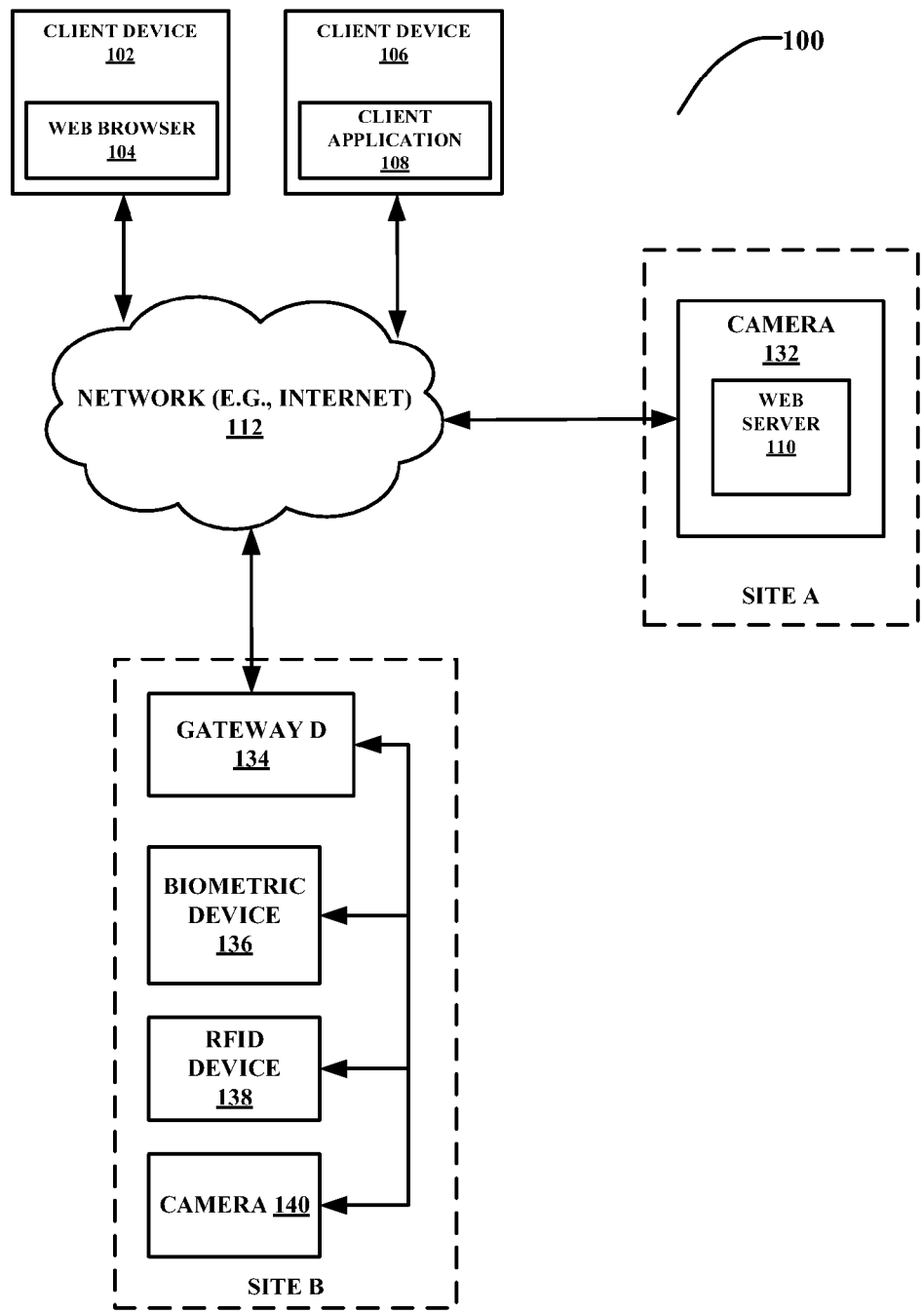
FIG. 1B is a network diagram depicting a network environment according to another embodiment, for exchanging data over a network.

In another embodiment, the camera 132 may include the web server 110 as illustrated in FIG. 1B.

Figure 2A:
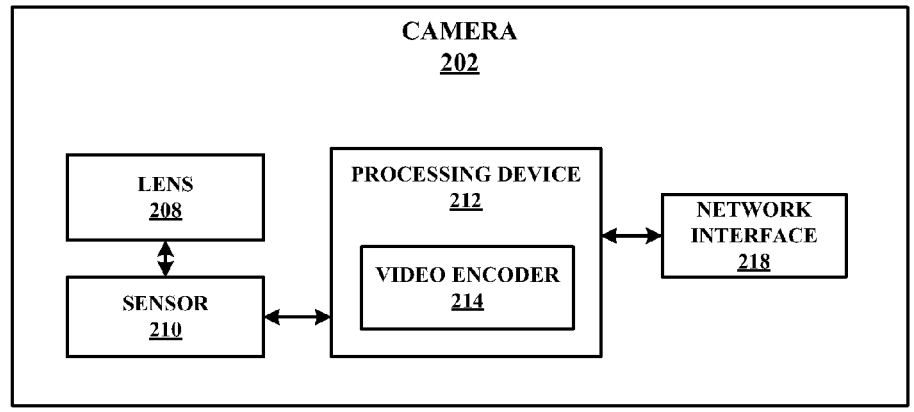
FIG. 2A is a block diagram illustrating an example embodiment of an IP camera.

FIG. 2A is a block diagram illustrating an example embodiment of a camera 202. The camera 202 includes an optical lens 208, an optical sensor 210 (such as a CMOS), a processing device 212, and a network interface 218.

The optical lens 208 captures images. The optical sensor 210 converts the images into data. The video encoder 214 encodes the data with one or more encoding algorithms. The network interface 218 enables the camera 202 to place data on the network 112.

In one embodiment, the video encoder 214 encodes the data into different video streams where each stream has a different encoding format. Each video stream includes data packets placed on the network 112. The camera 202 may generate multiple video streams via IP multicasting, which causes multiple display clients to connect to the same video stream.

In one embodiment, the packetized data streamed onto the computer network 112 is in a compressed format. The compression can take place in a number of ways. For example, the camera 202 can digitize and pre-compress the video stream, thereby avoiding the need for an external corresponding camera streamer to digitize or compress the video. Alternatively, a camera streamer (not shown) external to the camera 202 can perform compression of the digitized video. The compression can be of any suitable form, including any of the MPEG standards. Those of ordinary skill in the art will recognize that other suitable compression schemes and standards can be used.

Figure 2B:
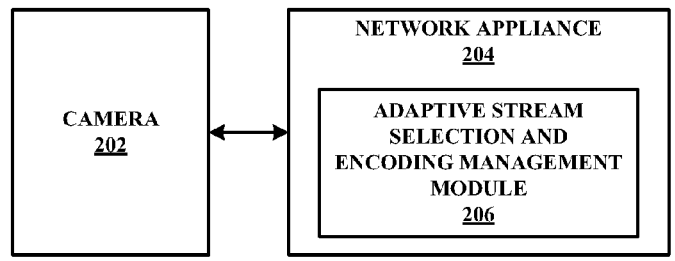
FIG. 2B is a block diagram illustrating an example embodiment of an IP camera stream appliance.

FIG. 2B is a block diagram illustrating an example embodiment of a camera 202 in combination with an optional network appliance 204. The network appliance 204 interfaces the camera 202 with the network 112, identifies a web server, and communicates with client devices. In one embodiment, the network appliance 204 includes an adaptive stream selection and encoding management module 206 configured to dynamically identify the web server and determine the specifications of the camera 202. The network appliance 204 then communicates the specifications of the camera 202 to the identified web server and dynamically reconfigures the camera 202 based on the configurations of the client device and the network conditions at the client device.

Figure 3A:
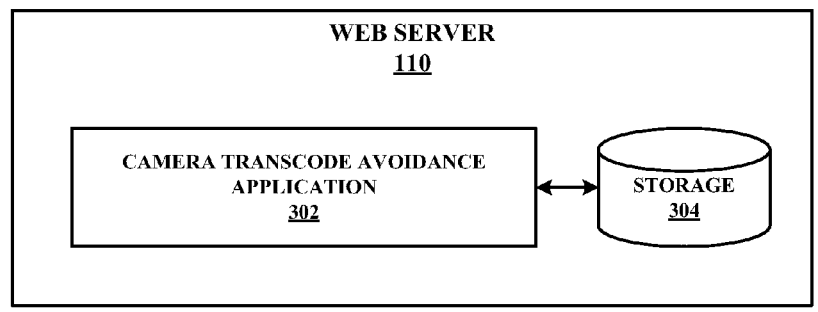
FIG. 3A is a block diagram illustrating an example embodiment of a web-based host.

FIG. 3A is a block diagram illustrating an example embodiment of a web server 110 also referred to as a web-based host. The web server 110 includes a camera transcode avoidance application 302 coupled to a storage device 304. A camera or a network appliance attached to a camera discovers the web server 110 by contacting the web browser at a predefined location. The web server 110 dynamically determines data configuration of each data stream from the camera, configurations of the client device and network conditions at a client device. The web server 110 further dynamically identifies a data stream for the client device based on the data configuration of each data stream, the configurations of the client device, and the network conditions at the client device so that the client device does not need to transcode the identified data stream or any other intermediary data streams from the camera. In one embodiment, the web server refers the client device to the camera so that the client device communicates directly with the camera and not through the web server. In one embodiment, the web server directs the client device in response to a request from the client device for data stream from the camera. In another embodiment, the web server dynamically identifies the data stream for the camera prior to the request from the camera.

The storage device 304 stores the data configurations of the data streams from the camera, the configurations of the client device, and the network conditions at the client device.

Figure 3B:
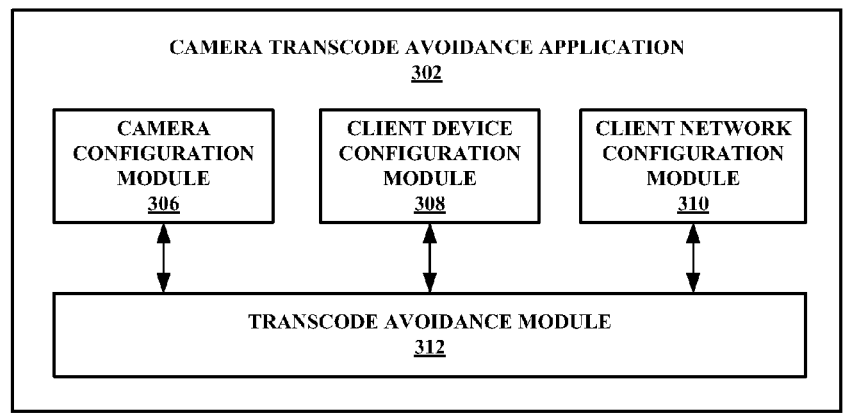
FIG. 3B is a block diagram illustrating an example embodiment of an IP camera transcode avoidance application.

FIG. 3B is a block diagram illustrating an example embodiment of a camera transcode avoidance application 302 of FIG. 3A. The transcode avoidance application 302 comprises a camera configuration module 306, a client device configuration module 308, a client network configuration module 310, and a transcode avoidance module 312.

The camera configuration module 306 determines the data configuration of a data stream from the camera. For example, the data configuration includes, but is not limited to, a resolution of a video stream, and a frame rate of the video stream from the camera.

The client device configuration module 308 determines a configuration or specification of the client device. For example, the configuration/specification of the client device includes, but is not limited to, a processing power of the client device, a display size of the client device, and a memory size of the client device, among others.

The client network configuration module 310 determines network configurations or settings at the client device. For example, a network configuration includes, but is not limited to, latency and/or a network bandwidth at the client device.

The transcode avoidance module 312 identifies a data stream from the camera to be viewed at the client device without the client device transcoding the identified data stream. For example, a camera generates several video data streams with different resolutions (HD, SD, etc. . . . ). If the client device has limited resolution, or bandwidth, the client device could stream from an identified corresponding data stream corresponding to the limited resolution or bandwidth of the client device (e.g. SD, low frame rate). As such, the client device would avoid having to transcode the data stream received from the camera or a data stream from a gateway connected to the camera.

In another embodiment, the transcode avoidance module 312 identifies a data stream from the camera based on a profile of a user at the client device. For example, a user having a VIP privilege profile may be able to stream video in high resolution (HD) or at a higher frame rate while other profiles can only stream at standard resolution (SD).

Figure 4:
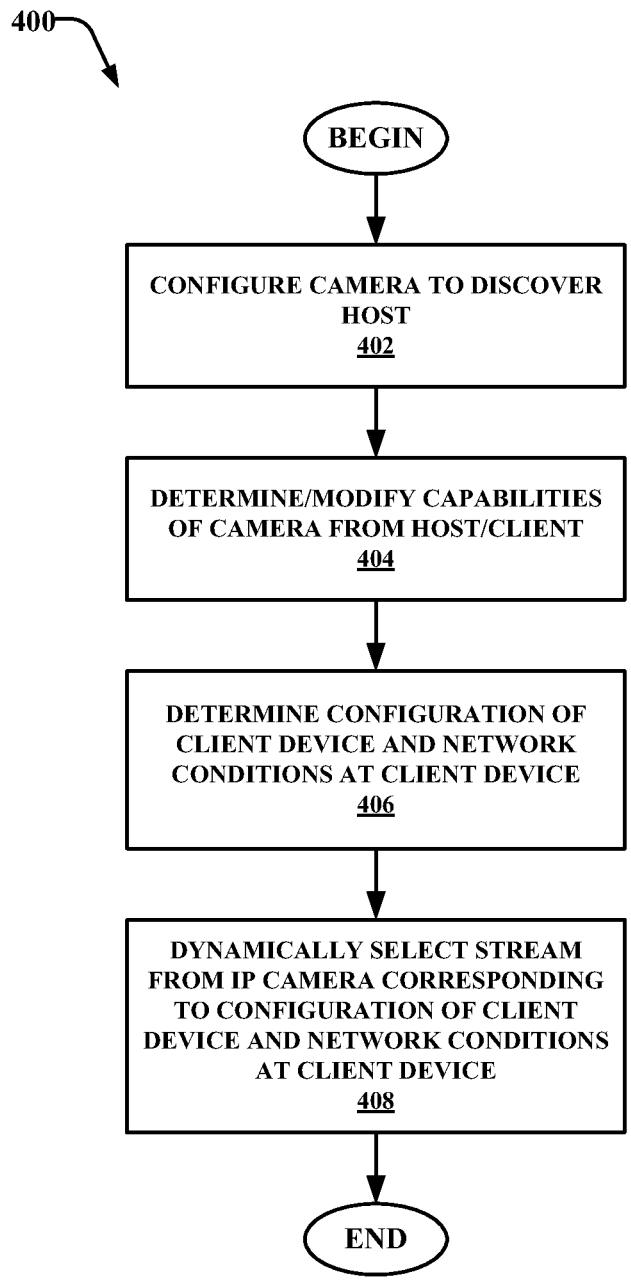
FIG. 4 is a flow chart of one embodiment of an example method for transcode avoidance of a stream from an IP camera.

FIG. 4 is a flow chart 400 of one embodiment of an example method for transcode avoidance of a stream from a camera. At 402, the camera discovers a web server. At 404, the web server determines the capabilities of the camera. At 406, the web server determines configurations of the client device and the network conditions at the client device in response to the camera identifying the web server. At 408, the client device dynamically selects the data stream from the camera corresponding to the configuration of the client device and the network conditions at the client device. It should be noted that the process is dynamic and is adaptive such that any changes in the operating conditions (e.g. client device switching from a 3G network to a wife network) are reflected in identifying a new corresponding data stream for the client device.

Figure 5:
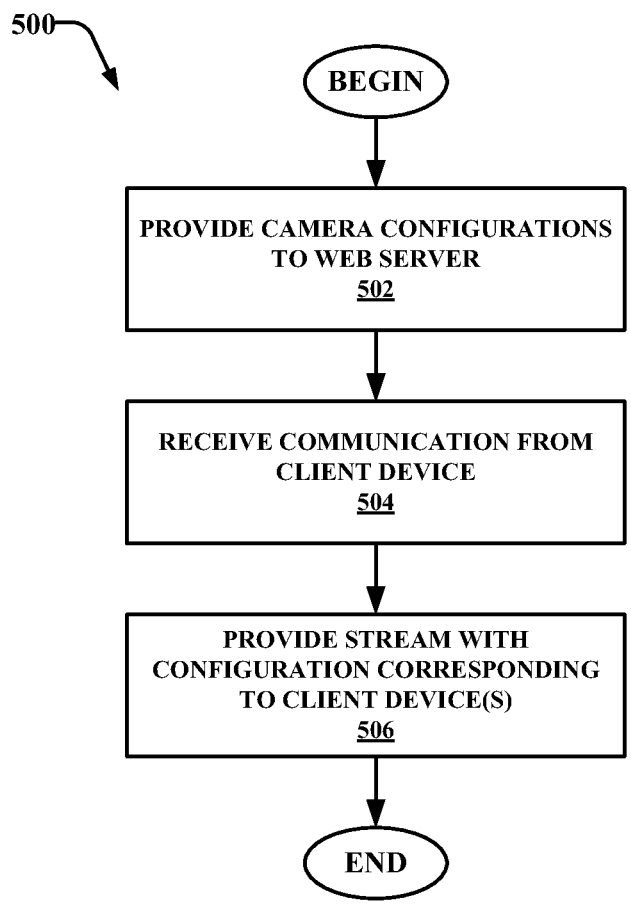
FIG. 5 is a flow chart of one embodiment of an example method for providing a stream from an IP camera.

FIG. 5 is a flow chart 500 of one embodiment of an example method for providing a stream from an IP camera. At 502, the camera specifications and configurations are provided to the web server 502. At 504, the camera receives a communication from the client device dynamically identifying a video stream. At 506, the camera provides a video stream with a configuration corresponding to the client device.

Figure 6:
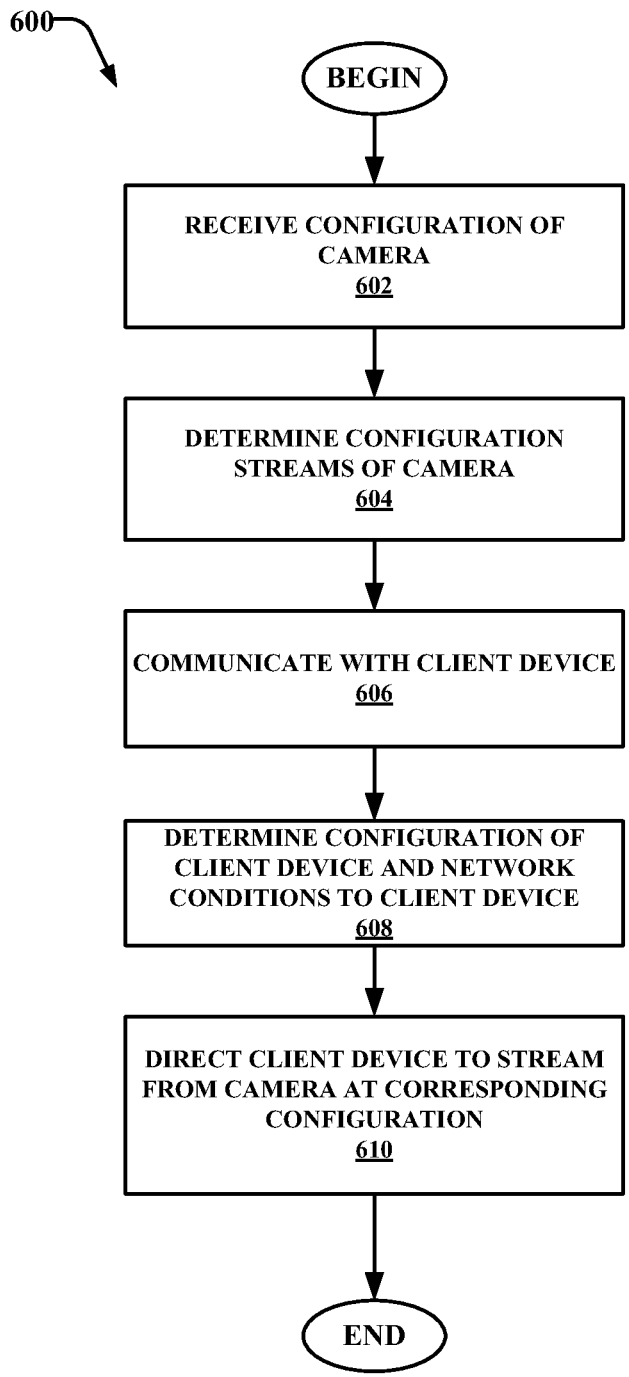
FIG. 6 is a flow chart of one embodiment of an example method for dynamically directing a stream from an IP camera to a client device.

FIG. 6 is a flow chart 600 of one embodiment of an example method for dynamically directing a stream from an IP camera to client devices. At 602, a web server receives configurations of a camera (e.g. resolution, specification). At 604, the web server determines stream configurations of the camera (e.g. type of compression, encoding). At 606, the web server communicates with the client device and determines at 608 configurations of the client device and network conditions at the client device. At 610, the web server dynamically identifies a video stream from the camera from which the client device can stream to avoid transcoding. The web server communicates the identified video stream to the client device.

Figure 7:
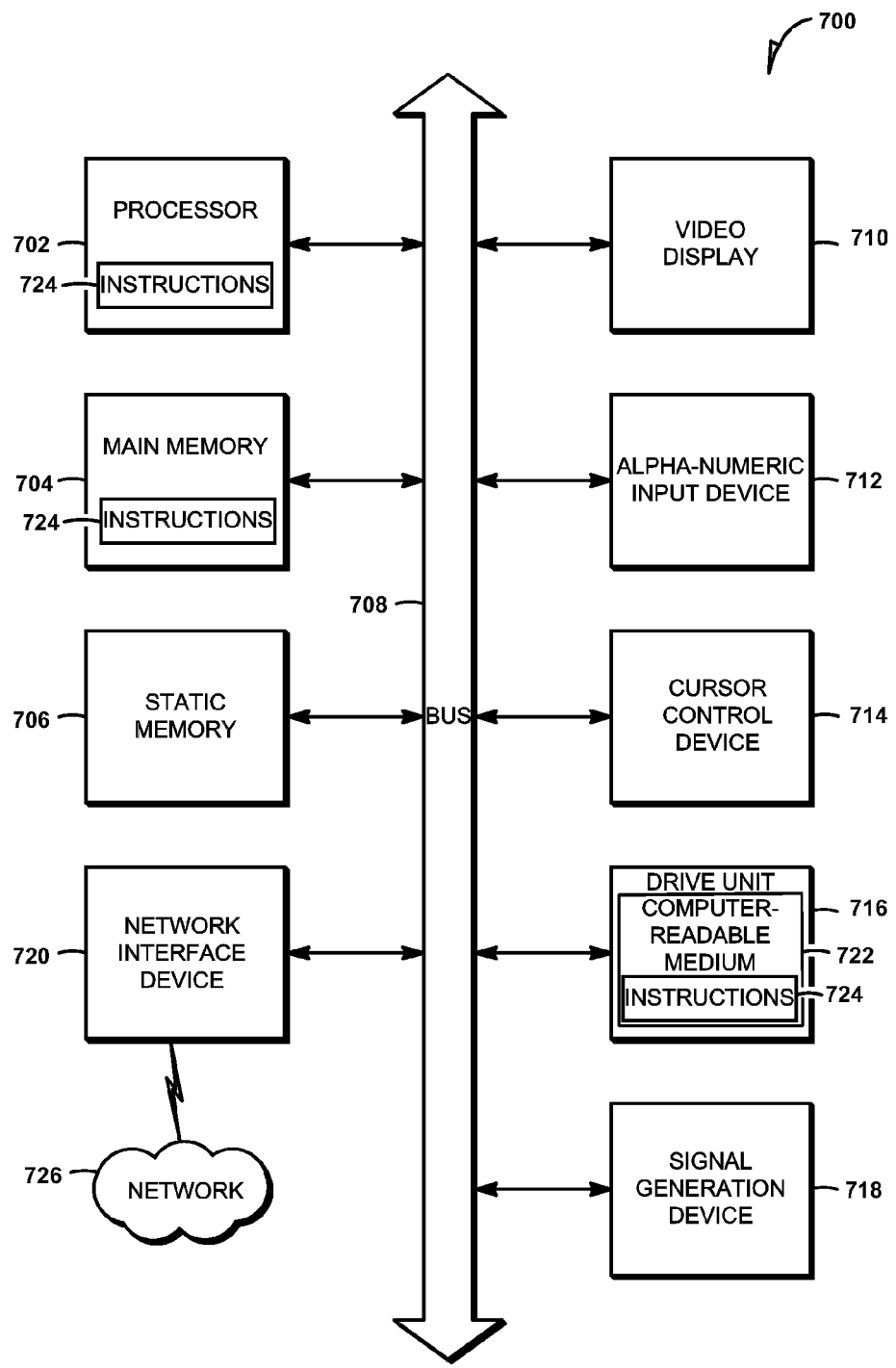
FIG. 7 shows a diagrammatic representation of machine in the example form of a computer system within which a set of instructions may be executed to cause the machine to perform any one or more of the methodologies discussed herein.

FIG. 7 shows a diagrammatic representation of machine in the example form of a computer system 700 within which a set of instructions may be executed causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a user interface (UI) navigation device 714 (e.g., a mouse), a disk drive unit 716, a signal generation device 718 (e.g., a speaker) and a network interface device 720.

The disk drive unit 716 includes a machine-readable medium 722 on which is stored one or more sets of instructions and data structures (e.g., software 724) embodying or utilized by any one or more of the methodologies or functions described herein. The software 724 may also reside, completely or at least partially, within the main memory 704 and/or within the processor 702 during execution thereof by the computer system 700, the main memory 704 and the processor 702 also constituting machine-readable media.

The software 724 may further be transmitted or received over a network 726 via the network interface device 720 utilizing any one of a number of well-known transfer protocols (e.g., HTTP).

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical media, and magnetic media.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system, comprising:
   a camera configured to generate a plurality of data streams, each data stream having a corresponding data configuration;
   a web server configured to identify the camera, to dynamically determine data configuration of each data stream, a configuration of a client device, and network conditions at the client device, to dynamically identify a data stream for the client device based on the data configuration of each data stream, the configuration of the client device, and the network conditions at the client device, and to refer the client device to receive the identified data stream from the camera; and
   a network appliance coupled to the camera, the network appliance comprising an adaptive stream selection and encoding management module configured to identify the web server, to identify the specifications of the camera, to communicate the specifications of the camera to the web server, to dynamically reconfigure the camera based on the configurations of the client device and the network conditions at the client device.

2. The system of claim 1 wherein the web server further comprises:
   a transcode avoidance application comprising a camera configuration module, a client device configuration module, a client network configuration module, and a transcode avoidance module, the transcode avoidance module configured to dynamically identify a data stream from the camera to be viewed at the client device without the client device transcoding the identified data stream; and
   a storage device for storing the data configurations of the plurality of data streams from the camera, the configurations of the client device, and the network conditions at the client device.

3. The system of claim 2 wherein the camera configuration module is configured to dynamically determine the data configuration of a data stream from the camera, the data configuration comprising a resolution of an audio or video stream, a frame rate of the video stream, a sample rate of the audio stream from the camera, and a compression type, wherein the client device configuration module is configured to dynamically determine a processing power of the client device, a display size of the client device, a memory size of the client device, and a utilization ratio of the processing power of the client device.

4. The system of claim 2 wherein the client network configuration module is configured to dynamically determine a network bandwidth at the client device.

5. The system of claim 2 wherein the camera transcode avoidance application is configured to identify the data stream from the camera based on a profile of a user at the client device.

6. The system of claim 1 wherein the camera comprises the web server.

7. A computer-implemented method comprising:
   generating a plurality of data streams at a camera, each data stream having a corresponding data configuration;
   identifying the camera at a web server;
   dynamically determining, at the web server, data configurations of each data stream, a configuration of a client device, and network conditions at the client device;
   dynamically identifying a data stream for the client device based on the data configurations of each data stream, the configurations of the client device, and the network conditions at the client device;
   referring the client device to receive the identified data stream from the camera;
   identifying the web server with a network appliance coupled to the camera;
   identifying the specifications of the camera at the network application;
   communicating the specifications of the camera to the web server; and
   dynamically reconfiguring the camera based on the configuration of the client device and the network conditions at the client device with an adaptive stream selection and encoding management module of the network appliance.

8. The computer-implemented method of claim 7 wherein the web server further comprises:
   a transcode avoidance application comprising a camera configuration module, a client device configuration module, a client network configuration module, and a transcode avoidance module, the transcode avoidance module configured to dynamically identify a data stream from the camera to be viewed at the client device without the client device transcoding the identified data stream; and a storage device for storing the data configurations of the plurality of data streams from the camera, the configurations of the client device, and the network conditions at the client device.

9. The computer-implemented method of claim 8 wherein the camera configuration module is configured to dynamically determine the data configuration of a data stream from the camera, the data configuration comprising a resolution of an audio or video stream and a frame rate of the video stream, a sample rate of the audio stream from the camera, and a compression type, wherein the client device configuration module is configured to dynamically determine a processing power of the client device, a display size of the client device, a memory size of the client device, and a utilization ratio of the processing power of the client device.

10. The computer-implemented method of claim 8 wherein the client network configuration module is configured to dynamically determine a network bandwidth at the client device.

11. The computer-implemented method of claim 8 wherein the camera transcode avoidance application is configured to identify the data stream from the camera based on a profile of a user at the client device.

12. The computer-implemented method of claim 7 wherein the camera comprises the web server.

13. A non-transitory computer-readable storage medium storing a set of instructions that, when executed by a processor, cause the processor to perform operations, comprising:

generating a plurality of data streams at a camera, each data stream having a corresponding data configuration;

identifying the camera at a web server;

dynamically determining, at the web server, data configurations of each data stream, a configuration of a client device, and network conditions at the client device;

dynamically identifying a data stream for the client device based on the data configurations of each data stream, the configurations of the client device, and the network conditions at the client device;

referring the client device to receive the identified data stream from the camera;

identifying the web server with a network appliance coupled to the camera;

identifying the specifications of the camera at the network application;

communicating the specifications of the camera to the web server;

dynamically reconfiguring the camera based on the configuration of the client device and the network conditions at the client device with an adaptive stream selection and encoding management module of the network appliance.

14. The non-transitory computer-readable storage medium of claim 13 wherein the web server further comprises:

a transcode avoidance application comprising a camera configuration module, a client device configuration module, a client network configuration module, and a transcode avoidance module, the transcode avoidance module configured to dynamically identify a data stream from the camera to be viewed at the client device without the client device transcoding the identified data stream; and a storage device for storing the data configurations of the plurality of data streams from the camera, the configuration of the client device, and the network conditions at the client device.

15. The non-transitory computer-readable storage medium of claim 14 wherein the camera configuration module is configured to dynamically determine the data configuration of a data stream from the camera, the data configuration comprising a resolution of an audio or video stream, a frame rate of the video stream, or a sample rate of the audio stream from the camera, and a compression type, wherein the client device configuration module is configured to dynamically determine a processing power of the client device, a display size of the client device, a memory size of the client device, and a utilization ratio of the processing power of the client device.

16. The non-transitory computer-readable storage medium of claim 14 wherein the client network configuration module is configured to dynamically determine a network bandwidth at the client device.

17. The non-transitory computer-readable storage medium of claim 14 wherein the camera transcode avoidance application is configured to identify the data stream from the camera based on a profile of a user at the client device.

18. The non-transitory computer-readable storage medium of claim 13 wherein the camera comprises the web server.

* * * * *